Oct. 14, 1969  H. S. DAVIS  3,472,265
SEQUENTIAL DISTRIBUTING VALVE
Filed Feb. 1, 1968  3 Sheets-Sheet 1

INVENTOR.
HARRY S. DAVIS
BY *Harry H. Schofer*
ATTORNEY

Oct. 14, 1969  H. S. DAVIS  3,472,265
SEQUENTIAL DISTRIBUTING VALVE
Filed Feb. 1, 1968  3 Sheets-Sheet 2

INVENTOR.
HARRY S. DAVIS
BY
ATTORNEY

Oct. 14, 1969

H. S. DAVIS 3,472,265

SEQUENTIAL DISTRIBUTING VALVE

Filed Feb. 1, 1968

INVENTOR.
HARRY S. DAVIS

BY *[signature]*

ATTORNEY

United States Patent Office 3,472,265
Patented Oct. 14, 1969

3,472,265
SEQUENTIAL DISTRIBUTING VALVE
Harry S. Davis, c/o Davis Flow Valve, Inc., 1408-B NE.
4th Ave., Fort Lauderdale, Fla. 33304
Filed Feb. 1, 1968, Ser. No. 702,473
Int. Cl. F16k 11/18, 31/52
U.S. Cl. 137—119                                   8 Claims

ABSTRACT OF THE DISCLOSURE

A sequential distributing valve having an inlet for a supply of fluid under pressure and at least two outlets, a valve means, having an axial and a rotatable movement, and including rotatable ball valves, at least one less than the number of outlets, the valve means operable in one direction by the admission of fluid under pressure and in the other direction by gravity or a spring, and cam surfaces operable to advance the valve means step-by-step in response to the admission and termination of fluid supply to the sequential distributing valve, and ball valves having the double function of rolling on the cam surfaces to advance the valve means in a step-by-step motion and obstructing those outlets through which no fluid is to be discharged.

Background of the invention

This invention relates to valves, and more specifically to a sequential distributing valve operable to sequentially deliver a fluid under pressure from a source to one or more discharge or distribution lines at predetermined intervals.

While not limited thereto, this invention finds especial application in irrigation systems, wherein water from a supply such as a reservoir, well, or city main, is delivered in sequence to a number of distribution lines each of which may have a number of sprinkler or spray heads and the like. Such systems usually include at least one sequential distributing valve which is operable to deliver water to the several distribution lines, one at a time, at desired intervals in a predetermined sequence. The sequential distributing valve or valves may be manually actuated, but are frequently actuated by a timing mechanism which controls the time that the sequencing operation begins and also controls the sequencing intervals. Heretofore such systems included a valve in each distribution line which is opened and closed, hydraulically and/or electrically, by the timing mechanism, or a single rotary valve was provided to control a plurality of distribution lines to sequentially deliver water to one or more lines. Such known systems require a number of valves, or a single valve having a number of moving parts, and are costly to install and frequently require expensive servicing.

Reference is made to my patents numbered 3,154,090 issued Oct. 27, 1964, and 3,224,457 and 3,234,458 issued on Dec. 21, 1965, which disclose sequential distributing valves having one or more freely movable ball valves within a free flow passage movable under the forces of gravity and fluid pressure to sequentially control the flow of fluid from two or more outlets. The valves disclosed in these patents work admirably well and free from trouble, but suffer from the disadvantage that they must be installed in a certain position. While, in most cases, it is possible to arrange the piping to such valves so that they can be used in the intended position, there are occasions when the sequential distributing valve must be disposed in positions other than upright to accommodate the necessary piping connections.

Summary of the invention

It is an object of this invention to provide a novel sequential distributing valve which can be installed in any position to function reliably and efficiently.

It is a further object to provide a novel sequential distributing valve in which one or more ball valve or valves serve the double function of controlling the discharge of fluid to several branch lines and producing the sequencing action of the valve.

It is a still further object to provide a novel sequencing valve which is simple in construction, which can be manufactured cheaply using plastic materials, and which includes a relatively few movable parts.

The attainment of the above objects, as well as other objects and advantages, will be fully understood from a consideration of the following detailed description and from the accompanying drawings.

In order to attain the above objects, my invention comprises a valve housing having an axial inlet for a fluid, such as water, for example, and at least two outlets arranged in a ring, the axis of the ring coinciding with the axis of the inlet. Inlet means, including a piston controlled valve responsive to the inlet pressure, admits fluid from the inlet to an annular flow passage directly in communication with the outlets. A series of inclined surfaces, equal in number to the outlets, are positioned in the flow passage, one between each adjacent pair of outlets, and on the opposite wall of the flow passage there is an equal number of inclined surfaces, the inclined surfaces on both walls sloping in the same direction. The inclined surfaces in the flow passage are positioned so that the high points of the inclined surfaces on one wall lie intermediate the high and low points of the inclined surfaces of the opposite wall. The piston which controls the supply of fluid from inlet into the annular flow passage is part of a valve means, and is capable of axial and rotary movement and carries a guide consisting of a pair of hollow guide members arranged in telescopic relation, including a spring within the hollow guide to urge the piston toward its cutoff position. When used in an upright position with the outlets at the top, the spring may be omitted and the force of gravity relied upon to urge the piston toward its cutoff position. Connected with the piston is a spider having one or more radial arms, one less than the number of outlets, and having the same angular spacing as the outlets, each arm carrying thereon a ball valve. The ball valves are rotatably mounted on the arms of the spider, and are radially spaced an equal distance as the inclined surfaces and the centers of the outlets. When fluid is admitted into the inlet, the piston is forced in a direction toward the outlets to uncover one or more slots in the cylinder housing the piston, and at the same time moving the spider and ball valves attached thereto toward the inclined surfaces between the outlets, whereby the ball valves are cammed toward the outlets to close some of them, leaving at least one outlet open to discharge fluid from the annular flow passage. When the supply of fluid to the sequencing valve is discontinued, the piston drops to cut off the flow of fluid in the flow passage, the ball valves move away from the outlets and strike the inclined surfaces on the opposite wall, riding down said inclined surfaces and coming to rest at the base of said surfaces in a position between outlets, so that, when the supply of fluid to the inlet is again initiated, the cycle is repeated.

For a more detailed description of the invention, reference is made to the disclosure appearing below and to the accompanying drawings, in which.

Figure 1:
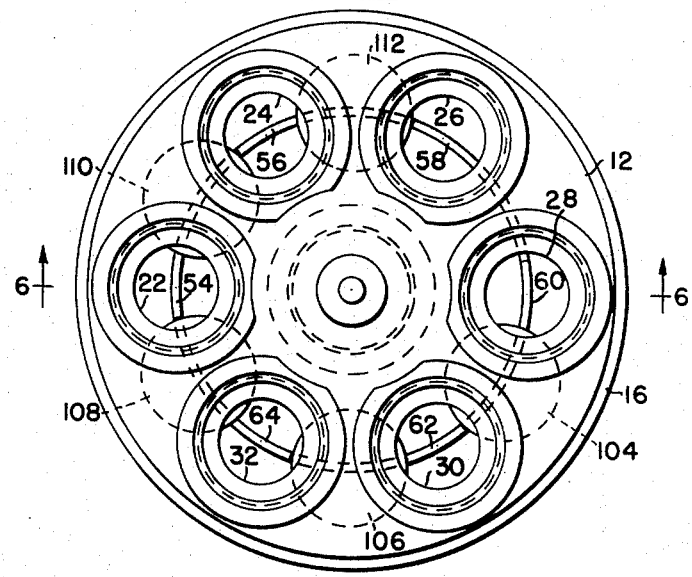
FIG. 1 is a plan view of my novel sequential distributing valve, illustrating a number of internal parts in broken lines.
Figure 6:
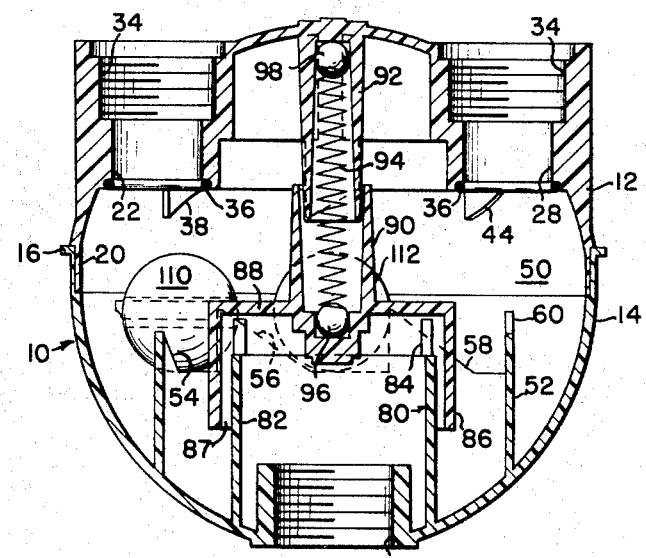
FIG. 6 is a vertical section of the sequential distributing valve as taken along the line 6—6 of FIG. 1.
Figure 7:
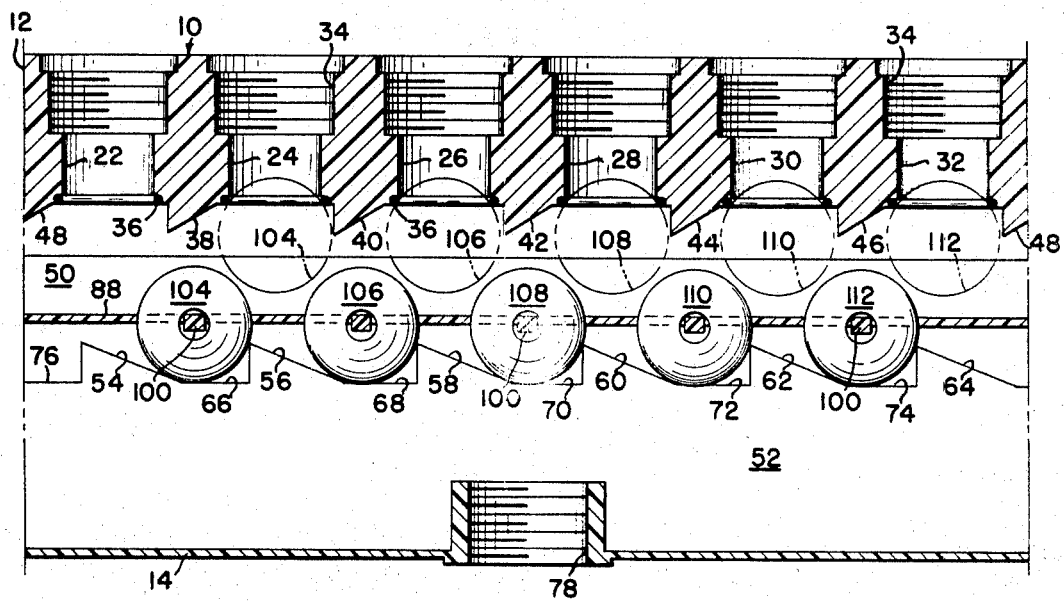
FIG. 7 is a developed view through the sequential distributing valve illustrating the relative positioning of the valves, outlets, and inclined surfaces, in which the pressure actuated piston has been omitted.

In the above description of the several figures of the accompanying drawings, the terms "upper" and "lower" are used only in a relative sense as illustrated in FIGS. 1, 6 and 7, in view of the fact that the sequencing valve can be used in any position.

Description of the preferred embodiment

Figure 2:
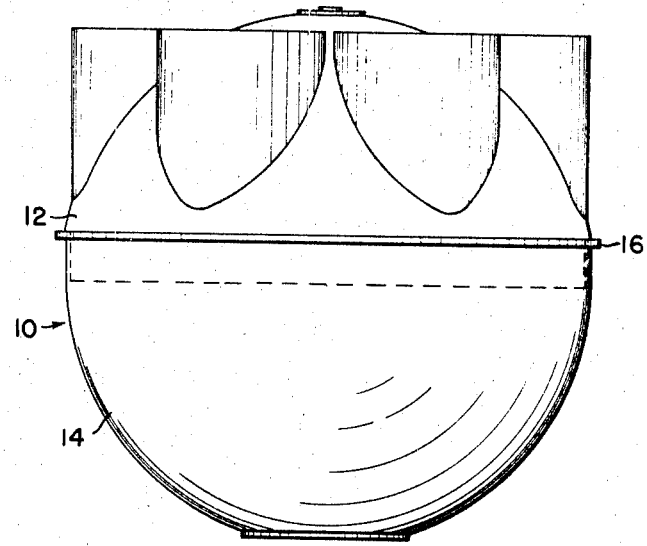
FIG. 2 is an elevation view.

Referring to the accompanying drawings, and particularly to FIGS. 2 and 6 wherein the sequential distributing valve is designated by the numeral 10 in its entirety, the housing consists of an upper half 12 and a lower half 14, the entire unit being spherical in form, and each half being generally in the form of a hollow hemisphere. The lower half 14 includes an annular flange 16 around its upper open end, which is rabbeted at 18 to receive an annular downwardly extending lip 20 on the open end of the upper half 12. When assembled, as shown in FIG. 6, with the lip 20 cemented within the rabbet 18, the two parts form a fluid tight valve housing, the upper half 12 of which includes a series of outlets 22, 24, 26, 28, 30 and 32, extending axially of the housing with their centers lying in a ring coaxial of the housing. Each of the outlets is threaded at 34 at its outer end to receive a conductor (not shown) leading to one or more spray or sprinkler heads of an irrigation system, as is well known in the art. The inner end of each outlet is grooved to receive an O-ring 36 to provide a fluid tight valve seat for a spherical valve, as will be seen later in this disclosure.

A series of inclined surfaces 38, 40, 42, 44, 46 and 48, depend from the upper wall of the upper half 12 of the housing, these surfaces being disposed in a ring and all sloping in the same direction. As seen in FIG. 7, the high point of each inclined surface is adjacent one outlet and its low point is adjacent the adjoining outlet. The ring of inclined surfaces 38, 40, 42, 44, 46 and 48 lies in the same circle as the centers of the outlets 22, 24, 26, 28, 30 and 32.

The upper and lower halves of the housing enclose an annular flow passage 50, and in the lower part of this passage and extending up from the bottom wall is an annular or ring-shaped rail 52, on the upper portion of which is formed a series of equally spaced inclined surfaces 54, 56, 58, 60, 62 and 64. The inclined surfaces 54, 56, 58, 60, 62 and 64 are equal in number with the inclined surfaces in the upper half, and slope in the same direction. The low point or foot of each inclined surface on the ring 52 is separated from the high point of an adjacent inclined surface by a flat surface, as seen in FIG. 7, in which a flat surface 66 separates the low point of the inclined surface 54 and the high point of the inclined surface 56; a flat surface 68 separates the low point of inclined surface 56 and high point of inclined surface 58; a flat surface 70 separates the low point of inclined surface 58 and high point of inclined surface 60; a flat surface 72 separates the low point of inclined surface 60 and the high point of inclined surface 62; a flat surface 74 separates the low point of inclined surface 62 and the high point of inclined surface 64; and a flat surface 76 separates the low point of inclined surface 64 and the high point of inclined surface 54. The ring-shaped rail 52 and the inclined surfaces 54, 56, 58, 60, 62 and 64 and the flat surfaces 66, 68, 70, 72, 74 and 76 thereon form a circle having the same diameter as the ring in which the inclined surfaces 38, 40, 42, 44, 46 and 48 lie, and the inclined surfaces in the upper and lower halves all slope in the same direction and are concentrically disposed. The flat surfaces 66, 68, 70, 72, 74 and 76 are disposed directly below the inclined surfaces 38, 40, 42, 44, 46, and 48, respectively, and the inclined surfaces 54, 56, 58, 60, 62 and 64 are disposed substantially directly below the outlets, as shown in FIG. 7.

Fluid under pressure is admitted into the annular flow passage 50 by way of a fluid inlet means comprising a threaded inlet 78 and a mean 80 responsive to the fluid inlet pressure. The threaded inlet 78 is disposed in the lower half 14, coaxially of the ring-shaped rail 52 and the axis of the ring containing the outlets 22. The threaded inlet 78 is adapted to receive a supply pipe (not shown) delivering a fluid under pressure, such as water, for example, from a city main or from a pump. The threaded inlet 78 projects into a cylinder 82 of the means 80 responsive to the fluid inlet pressure, said cylinder being of turreted form having a series of outlet slots 84 around the upper end thereof. A loose fitting piston 86 having a depending annular wall surrounds the cylinder 82, leaving a space 87 through which the fluid from the cylinder can discharge into the annular flow passage 50. The annular wall of the piston 86 is carried by and depends from a disc 88 also forming a part of the valve means to be described more fully later. In its lowered position the disc 88 contacts the upper end of the cylinder 82.

A pair of hollow guide members 90 and 92, concentrically of the threaded inlet 78, serve to maintain the piston 86 and the disc 88 connected therewith as well as the valve means, in their proper operating positions during the reciprocating and rotating motion thereof, as will appear hereinafter. The guide member 90 is connected with the upper surface of the disc 88 and the guide member 92 is connected with the inner wall of the upper half 12 of the housing, the members 90 and 92 being associated in telescopic relation. A coil compression spring 94 operates within the hollows of the guide members 90 and 92, there being a pair of ball bearings 96 and 98 on the ends of the spring 94 to allow easy rotation of the guide members relative to one another.

The valve means also include a spider comprising a series of angularly spaced, radially directed arms 100, the free end of each arm having an enlarged end 102 thereon. Each arm 100 forms a bearing for a spherical or ball valve 104, 106, 108, 110 and 112, rotatably mounted thereon, and prevented from slipping off by the enlarged ends 102. Each spherical valve has a bore through the center to accommodate the arm. The number of spherical or ball valves is at least one less than the number of outlets 22, 24, 26, 28, 30 and 32, and the centers of the spherical or ball valves lie in a ring having the same diameter as the ring formed by the centers of the outlets, in order to cooperate with said outlets to obstruct flow of fluid therefrom as will be fully described herein under the heading of "Operation."

The loose fitting piston 86 construction may or may not include a bleed port 114 passing through the disc 88, depending upon the degree of looseness. If sufficiently loose fitting, the bleed port 114 can be omitted, as there will be adequate bleeding of fluid through the outlet slots 84 and the annular space 87 when the supply of fluid into the threaded inlet 78 is cut off, to permit the spring 94, or gravity, to return the piston 86 to its lowermost position with the disc 88 in contact with the upper end of the cylinder 82 in the desired interval of time. If a tighter fitting piston were employed, it is evident that a bleed port would be required.

In the above described embodiment of the invention, a sequential distributing valve having six outlets is shown, and the valve means employs five spherical or ball valves cooperating therewith. It is to be understood that this invention is applicable to a distributing valve having any number of outlets, not less than two, and that the number of spherical valves may be one or two, or more than two, fewer than the number of outlets. Thus, for example, if it is desired to discharge through only one outlet at a time, the number of spherical valves is one less than the number of outlets, and if it is desired to discharge through two outlets at a time, the number of spherical valves is two less than the number of outlets, and so on.

Figure 3:
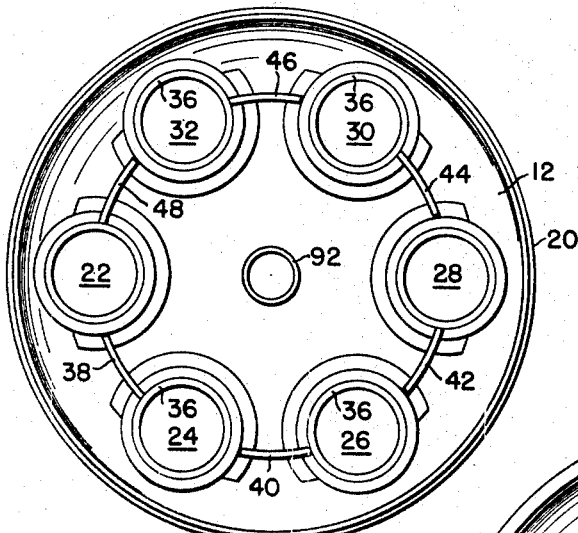
FIG. 3 shows the inside of the upper half of the valve housing.
Figure 4:
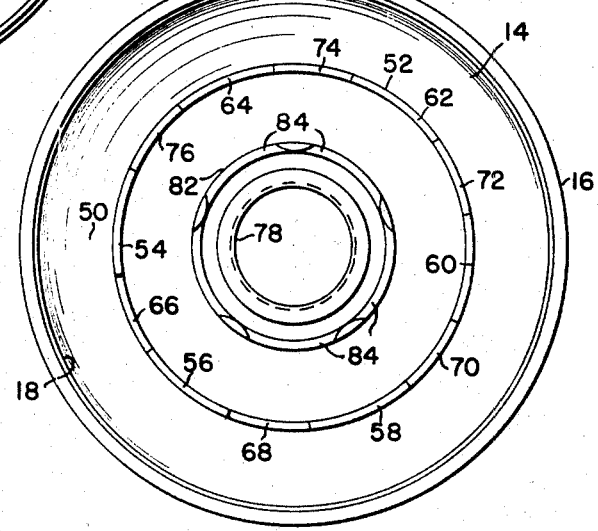
FIG. 4 shows the inside of the lower half of the valve housing.
Figure 5:
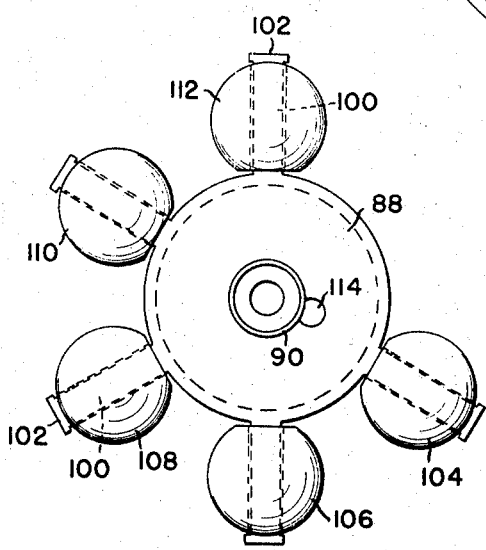
FIG. 5 illustrates the piston and the connected valve means.

Referring to FIG. 5, it is seen that the angular spacing of the arms 100 and the spherical or ball valves thereon corresponds to the angular spacing of the outlets as appearing in FIG. 3.

Operation

In the following description of operation, it may be assumed that the threaded inlet 78 is connected with a supply of water under pressure, and that each of the outlets 22, 24, 26, 28, 30 and 32 is connected with a distributing conduit, each conduit having one or more spray heads in an irrigation system. Reference will be made to FIGS. 6 and 7 showing the parts in their rest position.

When it is desired to operate the system, a valve (not shown) upstream of the distributing valve is opened, or a pump (not shown) is energized, to supply water under pressure through the threaded inlet 78 and into the cylinder 82, from where the water will escape through the outlet slots 84 and the annular space 87 between the outer surface of the cylinder 82 and the inner surface of the piston 86 and into the annular flow passage 50. The annular space 87 offers a restriction to the free flow of water into the flow passage 50, and as a consequence the pressure within the cylinder 82 quickly builds up sufficiently to raise the piston 86 and the parts attached thereto, lifting the disc 88 and the guide member 90 to an elevated position and uncovering the outlet slots 84 to allow free flow of water from within the cylinder into the annular flow passage 50. This movement will compress the coil spring 94 within the hollow guide members. If the device is intended for use solely in a vertical position as shown, the spring may be omitted, as the force of gravity on the movable parts is sufficient to restore the valve means to their rest position shown when the supply of water is terminated.

The incoming water fills the annular flow passage 50 if not already filled, and the water escapes from all of the outlets 22, 24, 26, 28, 30 and 32. The upward movement of the piston 86 by the pressure of the water in the cylinder 82, in addition to the force of the flow of water through the annular flow passage about the spherical valves and through the outlets, will carry with it the spider including the arms 100 with the spherical valves thereon, and as the spherical valves are lifted, the spherical or ball valves 104, 106, 108, 110 and 112 contact the inclined surfaces 38, 40, 42, 44 and 46, respectively, which will have a camming effect on the individual valves forcing them into seating position against the O-rings 36 in the outlets 24, 26, 28, 30 and 32, respectively, as shown in broken lines. Water flow through the outlets 24, 26, 28, 30 and 32 will be obstructed by the spherical valves seated therein and held in position by the pressure of the water within the annular flow passage 50, while water is permitted to flow freely through the unobstructed outlet 22 and into the conduit connected therewith. When the supply of water upstream of the threaded inlet 78 is discontinued, the pressure within the cylinder 82 quickly drops because of fluid flow through the outlet slots 84 and the bleed port 114 if one is provided. The pressure also drops quickly in the annular flow passage 50. The parts are returned to the rest position under the influence of gravity and/or spring 94, and in so doing the spherical or ball valves 104, 106, 108, 110 and 112 engage the inclined surfaces 56, 58, 60, 62 and 64, respectively, rolling down the surface thereof and coming to rest on the flat surfaces 68, 70, 72, 74 and 76, respectively, each ball valve having advanced one notch or one-sixth of a revolution from the position shown. The flat surfaces 66, 68, 70, 72, 74 and 76 are of sufficient length, with reference to the diameter of the spherical valves, so that when the spherical valves come to rest on the flat surfaces, each ball engages a high point of one inclined surface and the incline of the adjoining surface to prevent movement of the spherical valves in a circumferential direction, while the force of the spring 94 or the force of gravity will prevent movement in an axial direction.

When the flow of water through the sequential distributing valve 10 is again initiated, the piston 86 and the valve means attached thereto are again raised until the spherical or ball valves 104, 106, 108, 110 and 112 engage the inclined surfaces 40, 42, 44, 46 and 48, respectively camming the ball valves into seating relation with the outlets 26, 28, 30, 32 and 22, respectively, closing off the discharge of water through these outlets and permitting the free flow through the unobstructed outlet 24 and the conduit and spray heads attached thereto but not shown. As long as the supply of water into the sequential distributing valve 10 is not disturbed, discharge continues through the single outlet 24, and as soon as the supply is discontinued and the water pressure drops in the cylinder 82 and in the annular flow passage 50, the valve means will move away from the outlets. So long as the flow of water into the sequential distributing valve continues, the pressure in the cylinder 82 against the piston 86 and the pressure within the annular flow passage 50 acting directly against the seated ball valves 104, 106, 108, 110 and 112 are sufficient to overcome the force of gravity and/or the force of the compressed spring 94 within the guide members 90 and 92 to retain the seated ball valves against their respective outlets. When such pressures drop as the result of the cessation of supply of water, the valve means will move in an axial direction away from the outlets, and the ball valves 104, 106, 108, 110 and 112 will engage the inclined surfaces 58, 60, 62, 64 and 54, respectively, the ball valves rolling down the inclined surfaces and coming to rest on the flat surfaces 70, 72, 74, 76 and 66, respectively, and causing a rotative movement of the valve means. In this position of rest, the ball valves 104, 106, 108, 110 and 112 are directly below the inclined surfaces 42, 44, 46, 48 and 50, respectively, to be cammed by said surfaces when the flow of water is again initiated.

It is evident, from the foregoing, that each time the supply of water is initiated, the ball valves are raised and advanced one-twelfth of a revolution or 30° into seating engagement with five of the six outlets, and that when the supply of water is discontinued, the ball valves are lowered and advanced another one-twelfth of a revolution or 30°, coming to rest on the flat surfaces positioned about midway between the outlets. It is seen, therefore, that by operating the flow control means (not shown) to the sequential distributing valve 10, which may be a valve or a pump, six consecutive times, resulting in supplying water and discontinuing flow thereto six times, the valve means including the ball valves are operated six times, advancing 60° each complete cycle to close five outlets and leave one outlet open, whereby water is permitted to discharge sequentially from each of the six outlets 22, 24, 26, 28, 30 and 32, and at the end of such six cycles of starting and stopping the ball valves have completed a full circle of rotation in the annular flow passage 50 and have come to rest in their original starting position.

If six outlets and four ball valves were used, it is evident that water would be discharged through two outlets at a time, and that the same stepping operation of the valve means would take place. Thus, it is apparent that it is within the purview of this invention to use a sequential distributing valve having more than six outlets, or less than six outlets but not less than two, and that the number of ball valves should be at least one less than the number of outlets.

While, in the preceding description, the sequential distributing valve has been described as operating in a position in which the axis of the outlets is vertical and the outlets are uppermost, it is evident that the sequential distributing valve can operate in the same manner in any position. While, in the position illustrated, the annular flow passage 50 remains filled with water, it is not essential to the operation of the device that this condition obtain, but the water can drain from any or all of the outlets at the end of each cycle of on and off flow of water without impairing or affecting the operation as described. When used in the position illustrated, the spring 94 may be omitted, if desired, and the force of gravity depended upon to restore the parts to the position shown in full lines in FIG. 7 when the flow of water is cut off, but the device will operate in the same manner with the use of a spring plus the force of gravity. When used in any other position, however, a spring is essential, which spring must be sufficiently strong to overcome the force of gravity of the moving parts when used in a position in which the outlets are lowermost.

It is evident that all of the parts, except possibly the spring, can be made of plastic material, assuring a long life and resistance to corrosion, and that the mounting of the ball valves for rotating movement on their respective arms assures a rolling contact with the inclined surfaces, reducing the force of friction and presenting different areas of the ball valves against the seats of the outlets, thus avoiding wear in one particular area, and extending the life of the device.

If at any time it may be desired to remove, add, or replace a spring 94, it is a simple matter to drill away the upper end of the hollow interior of the guide member 92 to permit access to the spring chamber, make the necessary change, and to plug up the drilled opening to prevent leakage and to confine the spring 94 and the bearings 96 and 98 within the guide members.

I claim:

1. A sequential distributing valve, comprising: a housing having walls defining an annular flow passage; fluid inlet means into said flow passage; a plurality of equally spaced outlets disposed in a ring through one wall of said flow passage, said one wall including said outlets having an equal number of inclined surfaces, one inclined surface between each pair of adjoining outlets, and all surfaces sloping in the same direction, the high point of each inclined surface being adjacent one outlet and the low point thereof being adjacent an adjoining outlet; a series of inclined surfaces in the opposite wall of said flow passage, said surfaces in said opposite wall sloping in the same direction and in the opposite direction to the inclined surfaces in said one wall and being equal in number, the high points of the inclined surfaces in said one wall being staggered relative to the high points of the inclined surfaces of the said opposite wall whereby the high point of each inclined surface in one wall is intermediate the high points of a pair of adjacent inclined surfaces in the opposite wall, and vice versa; valve means associated with said fluid inlet means and comprising a plurality of valves, at least one less than the number of outlets, rotatably and axially movable means carrying said valves, said valves being disposed in a ring having a diameter equal to the diameter of said ring of outlets and having an angular spacing equal to the angular spacing of said outlets; said fluid inlet means including a means responsive to the pressure of fluid admitted thereto to urge said valve means in an axial direction toward said one wall having said outlets therein; and means urging said valve means in the direction of said opposite wall, whereby, when fluid is admitted into said inlets means and into said flow passage, said valve means are urged by fluid pressure toward said one wall including said outlets and each valve is urged against one of said inclined surfaces between said outlets to be cammed to an adjacent outlet to prevent flow of fluid therefrom, the fluid being permitted to discharge from at least one unobstructed outlet, and when the supply of fluid is discontinued, said valve means are urged toward said opposite wall, and engage the inclined surfaces in said opposite wall to be cammed to the low points on said inclined surfaces and come to a rest in a position which is between adjacent outlets in said one wall, so that each time the supply of fluid to said inlet means is initiated and discontinued, said valves are rotated in said flow passage in a step-by-step motion.

2. A sequential distributing valve as defined in claim 1, in which said outlets are circular, and said valves are spherical in form and have a diameter greater than that of said outlets.

3. A sequential distributing valve as defined in claim 1, in which said outlets are circular, and in which said valve means includes a spider having at least one radial arm, the number of radial arms being equal in number with the number of valves, said valves being spherical in form and rotatably mounted on said spider arms.

4. A sequential distributing valve as defined in claim 3, in which each inclined surface in said opposite wall includes, at the foot thereof, a flat surface on which a spherical valve comes to rest at the end of a cycle, each flat surface being disposed directly below an inclined surface in said one wall when the axis of the distributing valve is disposed in a vertical position with the outlets uppermost.

5. A sequential distributing valve as defined in claim 1, in which said inlet means includes a fluid inlet disposed radially of said housing, the axis of said inlet coinciding with the axis of said annular flow passage and with the axis of said ring of outlets.

6. A sequential distributing valve as defined in claim 1, in which said means responsive to the pressure of the fluid includes a cylinder having a series of outlet slots, a piston connected with said valve means and controlling the discharge of fluid from said cylinder into said flow passage, said piston including a bleed port discharging fluid from said cylinder into said flow passage.

7. A sequential distributing valve as defined in claim 6, including axially disposed guide means connected with said piston and with said housing, said guide means including a pair of members in telescopic relation.

8. A sequential distributing valve as defined in claim 6, including a guide means connected with said piston, said guide means comprising a pair of hollow members disposed in telescopic relation, one member being connected with said piston and the other member being connected with said housing, and said means urging said valve member in the direction of said opposite wall including a spring within said guide means.

References Cited

UNITED STATES PATENTS

| | | | |
|---|---|---|---|
| 3,154,090 | 10/1965 | Davis | 137—119 |
| 3,181,550 | 5/1965 | Okabe | 137—119 |
| 3,224,457 | 12/1965 | Davis | 137—119 |
| 3,224,458 | 12/1965 | Davis | 137—119 |
| 3,241,767 | 3/1966 | Jacobs | 239—66 |
| 3,402,890 | 9/1968 | Heitzman | 239—70 X |

WILLIAM F. O'DEA, Primary Examiner

DAVID J. ZOBKIW, Assistant Examiner

U.S. Cl. X.R.

137—624.18; 239—66